United States Patent [19]
Brandt, Jr.

[11] Patent Number: 5,402,687
[45] Date of Patent: Apr. 4, 1995

[54] PARALLEL PLATE PITOT

[76] Inventor: Robert O. Brandt, Jr., P.O. Box 5606 Hanover Center, Wilmington, N.C. 28403

[21] Appl. No.: 171,909

[22] Filed: Dec. 21, 1993

[51] Int. Cl.$^6$ ............................................. G01F 1/46
[52] U.S. Cl. ................................................. 73/861.66
[58] Field of Search ........................ 73/861.65, 861.66

[56] References Cited

U.S. PATENT DOCUMENTS

| | | | |
|---|---|---|---|
| 1,250,238 | 12/1917 | Spitzglass | 73/861.66 |
| 4,444,060 | 4/1984 | Yamamoto | 73/861.66 |

FOREIGN PATENT DOCUMENTS 2032118  4/1980  United Kingdom .............. 73/861.66

*Primary Examiner*—Herbert Goldstein
*Attorney, Agent, or Firm*—Robert G. Rosenthal

[57] ABSTRACT

A pitot of the type adapted to be positioned in a stream of moving fluid such as an air duct and accurately measures wide variations in flow rate. A first plate with opposing sides and opposing leading and trailing edges and a second plate has opposing sides and opposing leading and trailing edges. The plates are parallel to each other and are in overlying spaced relation. A first tube has a proximal end and a distal end and is connected in sandwich fashion between the first and second plates proximate the leading edges. The tube has a plurality of holes defining openings located proximate the leading edges of the plates, the holes being perpendicular to the plate surfaces. A second tube has a proximal and a distal end and is also connected in sandwich fashion between the plates, parallel to the first tube, proximate the trailing edges of the plates. Also provided are holes defining openings in the tube that are parallel to the surface of the plates. At the proximal end of the first tube the total pressure is sensed and at the proximal end of the second tube, the static pressure is sensed, the difference therebetween being the velocity pressure.

10 Claims, 3 Drawing Sheets

PARALLEL PLATE PITOT

This invention relates generally to the field of pitots and more particularly to averaging pitots.

BACKGROUND OF THE INVENTION

Pitot tubes have long been used in the measurement of air flow. Pitots measure the total pressure and the static pressure, the difference therebetween being the square of the velocity pressure which is proportional to either the velocity of the pitot moving through the air (such as in avionics) or the square of the air velocity moving past the pitot (such as in ductwork, etc.).

The measurement of total pressure is relatively simple. On the surface of any body, regardless of shape, immersed in a stream of fluid there is some point (often the forward most point) at which the fluid is brought to rest and the pressure acting is the total pressure of the undisturbed flow. Thus, the pressure can be determined by providing an orifice at that point and connecting it to a manometer. This is the basis of the classic pitot tube which has been universally adapted for the measurement of total pressure.

Static pressure on the other hand, is comparatively difficult to obtain as the flow at the static orifices should be the same, both in speed and direction, as it was before the measuring instrument was introduced. Thus, in order to avoid vortices, the static pressure is normally measured from a point which is at least four diameters (but preferably more) away from the leading edge of the measurement device. Nevertheless, it is difficult to produce a pitot that accurately and reliably measures low fluid velocities (below 50 feet per minute) at low cost. In addition, developing a pitot that is accurate at very low velocities as well as high velocities has also proved difficult.

With the foregoing in mind, it is an object of the present invention to provide a pitot which measures very low fluid flow rates.

Another object of the invention is to provide a pitot which measures high fluid flow rates.

Still another object of the invention is to provide a single pitot that measures both low and high fluid flow rates.

Yet another object of the invention is to provide a pitot that is accurate.

A still further object of the invention is to provide a pitot that is inexpensive.

A still further object of the invention is to provide a pitot that is easy to fabricate.

SUMMARY OF THE INVENTION

The foregoing objects are accomplished by providing a pitot of the type normally positioned in a stream of moving fluid, such as an air duct, characterized by its ability to accurately measure wide variations in flow rate, including flow rates as low as 50 feet per minute and as high as 5,000 feet per minute. The pitot comprises a first plate having opposing sides and opposing leading and trailing edges. A second plate also has opposing sides and opposing leading and trailing edges. The plates are positioned in substantial parallel overlying spaced relation. A first hollow elongate tube having a proximal end and a distal end is connected in sandwich fashion between the first plate and the second plate proximate the leading edges thereof. The first tube includes a plurality of spaced apart holes defining openings and wherein the openings are located proximate the leading edges of the first plate and the second plate. The openings are also perpendicular to the plane of the plates. A second hollow elongate tube having a proximal end and a distal end connected in sandwich fashion between the first plate and the second plate. The second tube being positioned proximate the trailing edges of the plates and including a plurality of spaced apart holes defining openings, the openings being proximate the trailing edges of the first and second plates and further being parallel to the plane of the first plate. Thus, when a fluid flows across the pitot, and output representative of the total pressure is produced at the proximal end of the first tube and an output representative of the static pressure is produced at the proximal end of the second tube. The difference therebetween may be measured to determine the velocity of the moving fluid.

BRIEF DESCRIPTION OF THE DRAWINGS

Some of the features and advantages of the invention having been briefly stated, others will appear from the detailed specification which follows, when taken in connection with the accompanying drawings in which.

DETAILED DESCRIPTION OF THE ILLUSTRATED EMBODIMENTS

Figure 1:
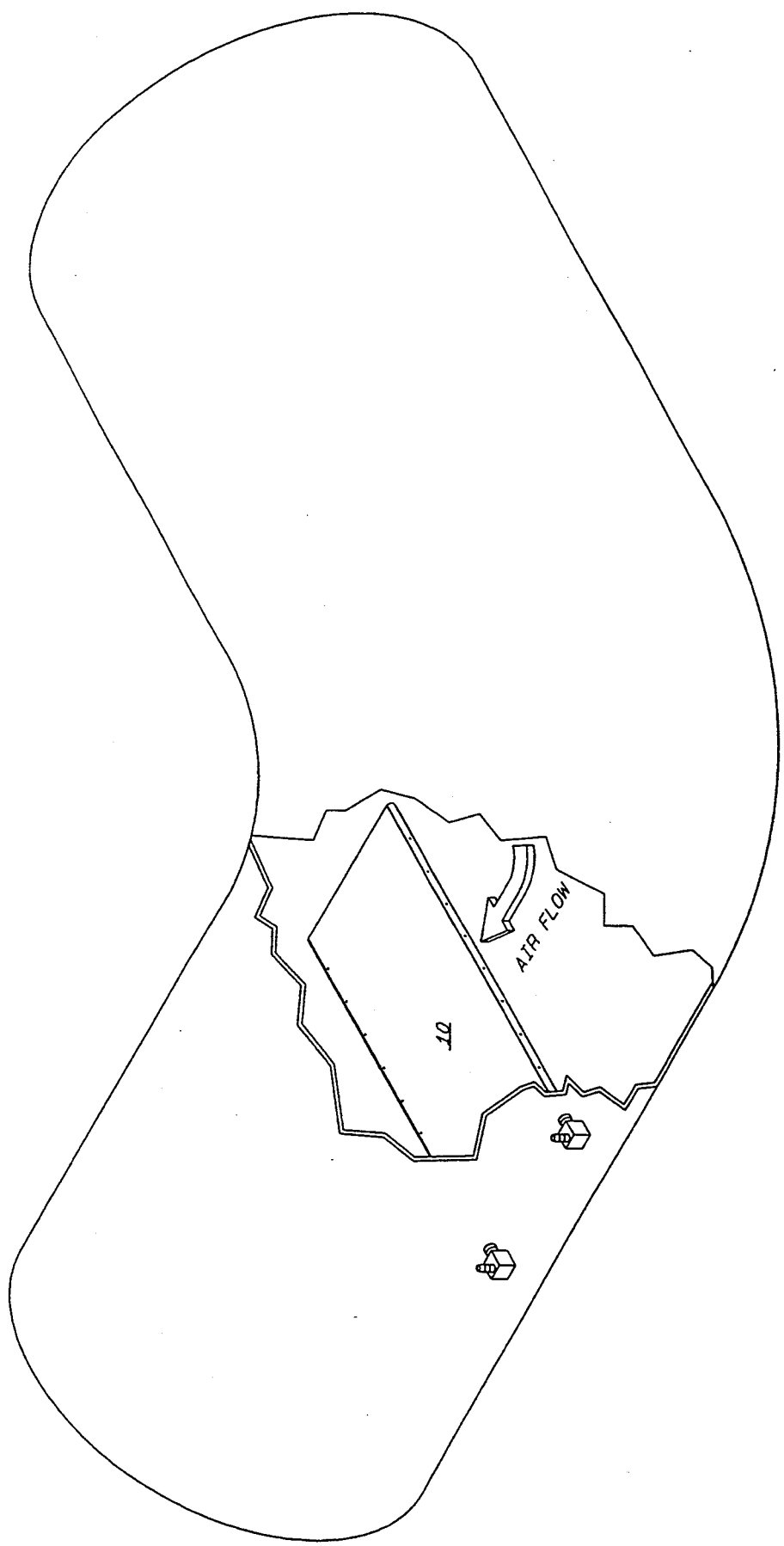
FIG. 1 is a perspective view partially broken away of the duct with the pitot according to the present invention positioned therein.
Figure 2:
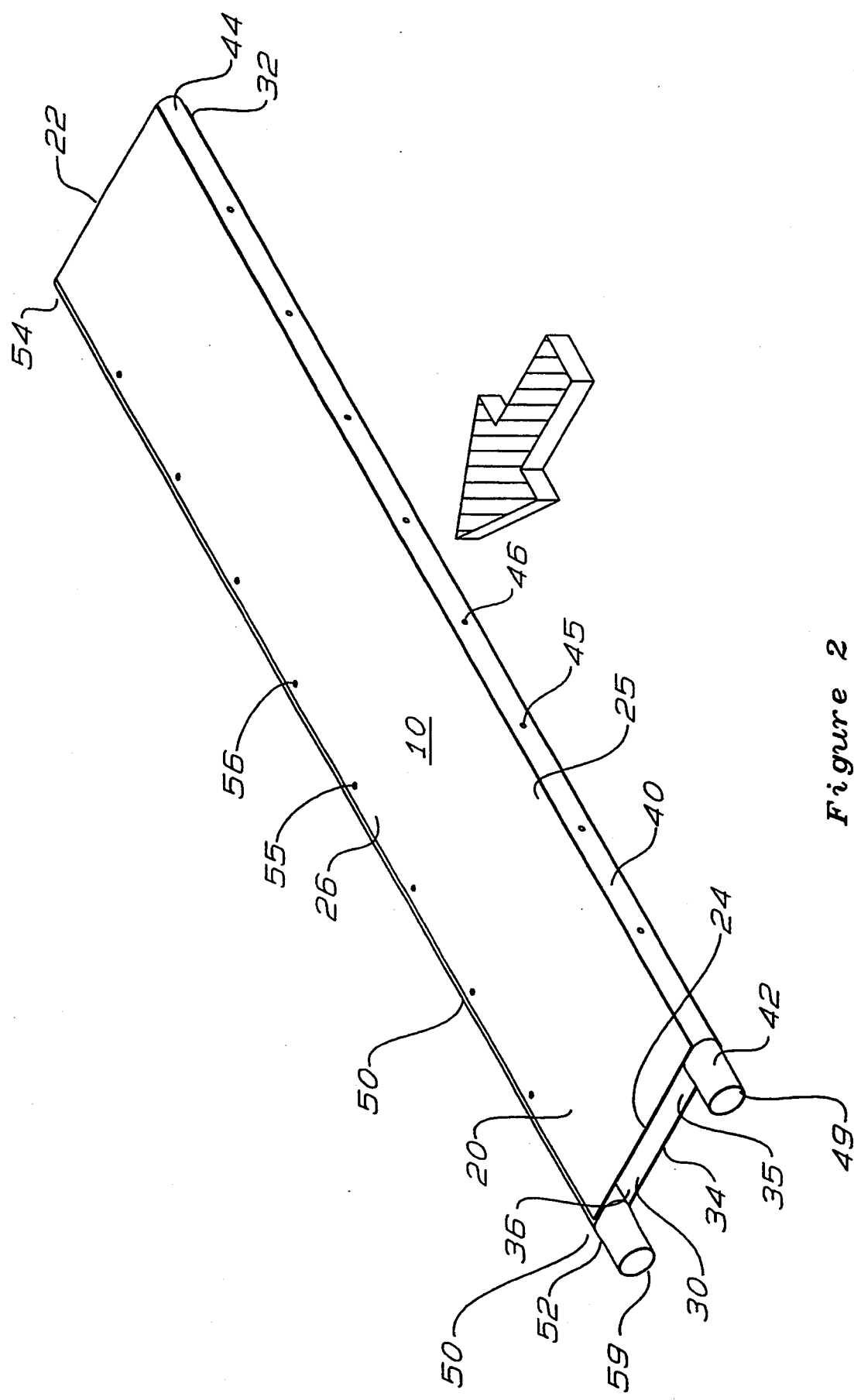
FIG. 2 is a perspective view of a pitot according to the present invention.

While the present invention will be described more fully hereinafter with reference to the accompanying drawings, in which particular embodiments are shown, it is to be understood at the outset that persons skilled in the art may modify the invention herein described while still achieving the favorable results of this invention. Accordingly, the description which follows is to be understood as a broad teaching disclosure directed to persons of skill in the appropriate arts and not as limiting upon the present invention.

Referring more specifically to the drawings, the pitot of the present invention is generally indicated at 10. The pitot comprises a pair of metal plates 20,30 and a pair of tubes 40,50.

The flat plates 20,30 are preferably made of sheets of thin metal such as stainless steel. A first plate 20 has opposing sides 22,24 and opposing leading and trailing edges 25,26 respectively. A second plate 30 also has opposing sides 32,34 and opposing leading and trailing edges 35,36 respectively.

With respect to dimensions, any dimension that is structural will suffice. However, design characteristics will be discussed in detail hereinbelow.

A first hollow elongate tube 40 having a proximal end 42 and a distal end 44 is connected in sandwich fashion between the first plate 20 and the second plate 30. The connection between the plates 20,30 and the tube 40 may be by any suitable means that does not disrupt fluid flow, such as by welding. The first tube 40 includes a plurality of spaced apart holes defining openings. As shown in the figures, the openings are located proximate the leading edges of the first and second plates 20,30. The openings are preferably located at the forward most point of the pitot 10. The distal end 44 is sealed such as with an end cap (not shown) and the proximal end 42 is connected to a total pressure connector 49.

Figure 3A:
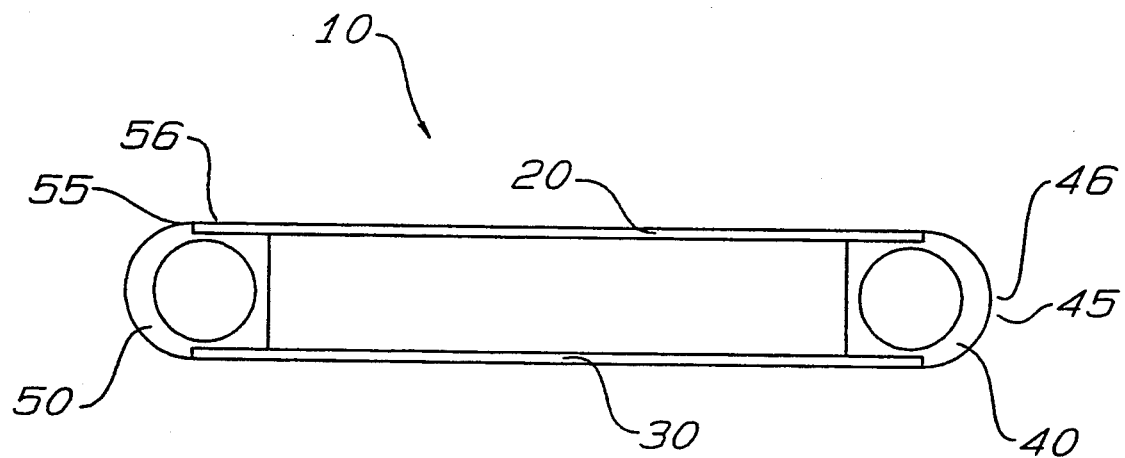
FIGS. 3a and 3b are cross sections of the pitot according to the present invention taken along line 3—3 of FIG. 1.
Figure 3B:
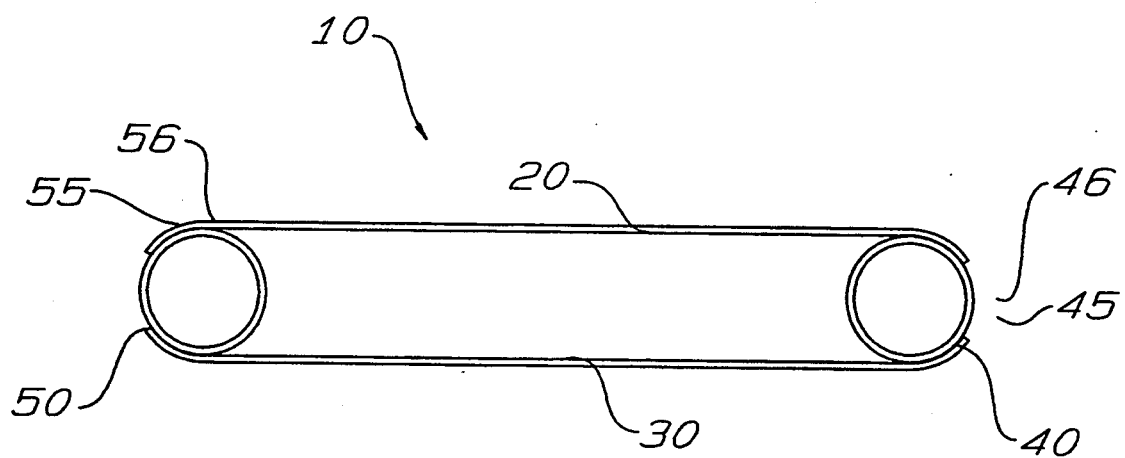

A second hollow elongate tube 50 having a proximal end 52 and a distal end 54 is connected in sandwich fashion between the first plate 20 and the second plate 30. The connection between the plates 20,30 and the tube 50 may be by any suitable means that does not disrupt fluid flow such as by welding. The second tube 50 includes a plurality of spaced apart holes defining openings. As shown in the figures openings are located proximate the trailing edge of the first plate 20 and the second plate 30 and specifically they are located parallel to the plane of the first plate (FIG. 3a). In the alternate embodiment of FIG. 3b, the first plate 20 actually overlies the tube 50 and, in this case, the openings extend through both the tube 50 and the plate 20 so that there is fluid communication between the duct and the interior of the tube. Again, as with the first tube 40, the distal end 54 is sealed and the proximal end is connected to a total pressure connector 59.

With respect to the foregoing plurality of openings, they should be spaced apart so as to provide equal flow weighting to the signal. For example, in a circular pipe, most of the flow volume occurs at the outer perimeter (weighted on equal area spacing), therefore, the openings should be closer together as one moves toward the outer perimeter of the pipe. On the other hand, in a fume hood where the pitot is in an airfoil having equal air flow along its length, the openings are spaced an equal distance from each other.

The pitot should be constructed such that the plates 20,30 are parallel and of equal size. Similarly, the tubes 40,50 should also be parallel and of equal length and diameter. With respect to more detailed design criteria, the pitot 10 should extend across the entire flow stream. Two other dimensions are also important. First, the distance between tubes 40,50 should be at least about four and preferably eight to ten times the tube diameter and second, the plate depth (distance between tubes) should at least be one-half the duct diameter. For example, assume the pitot is to be placed across a ten inch diameter duct. Thus, the distance between tubes should be at least five inches. Also, as stated, the ratio between the tube diameter and the plate length is preferably eight to ten times the tube diameter, thus making the tube diameter between about 0.625 and 0.5 inches. In addition, the ratio of pitot frontal area should be greater than five per cent and less than fifty per cent of the cross sectional area of the duct (or airfoil) into which it is placed and for most applications would be about ten per cent for accurate performance because when the flow is channeled into a more known pattern, by restricting the cross-sectional area of the flow, the velocity of the flow stream becomes more predictable.

In operation, the pitot 10 is enclosed by appropriate means within the duct. A fluid flow passes over the pitot and at the proximal end of the first tube, the total pressure reading is taken and at the proximal end of the second tube, the static pressure is taken. The foregoing outputs are then usually output to a pressure comparator to determine the velocity pressure which is the difference between the tube pressure and the static pressure.

The foregoing embodiments and examples are to be considered illustrative, rather than restrictive of the invention, and those modifications which come within the meaning and range of equivalence of the claims are to be included therein.

That which is claimed is:

1. A pitot of the type adapted to be positioned in a stream of moving fluid, such as an air duct, characterized by its ability to accurately measure wide variations in flow rate and comprising:
   a first plate having opposing sides and opposing leading and trailing edges;
   a second plate having opposing sides and opposing leading and trailing edges and wherein said first plate overlies said second plate in spaced relation;
   a first hollow elongate tube having a proximal end and a distal end connected in sandwich fashion between said first plate and said second plate proximate the leading edges thereof, said first tube including a plurality of spaced apart holes defining openings, said openings located proximate the leading edges of said first plate and said second plate;
   a second hollow elongate tube having a proximal end and a distal end connected in sandwich fashion between said first plate and said second plate, said second tube being positioned proximate the trailing edges thereof, said second tube including a plurality of spaced apart holes defining openings, said openings being proximate the trailing edge of said first plate and said second plate; and
   wherein the shape of the respective leading and trailing edges is symmetric and further wherein the respective first and second plates are substantially planar and unobstructed, the respective leading and trailing edges being curved and overlapping the respective first and second tubes, thereby ensuring smooth and even fluid flow past said pitot;
   whereby when a fluid flows across the pitot, an output signal representative of the total pressure is produced at the proximal end of the first tube and an output signal representative of the static pressure is produced at the proximal end of the second tube and the difference therebetween may be measured to determine the velocity of the moving fluid.

2. A pitot according to claim 1 wherein said openings in said first tube are perpendicular to the plane of said plates; and wherein said openings in said second tube are parallel to the plane of said plates.

3. A pitot according to claim 1 wherein said first tube and said second tube are of equal diameters.

4. A pitot according to claim 1 wherein the distance between said first tube and said second tube is at least four times the diameter of said tubes.

5. A pitot according to claim 1 wherein the diameter of said first tube and said second tube is between about four to ten times the diameter of the respective first and second tubes.

6. A pitot according to claim 1 wherein said openings are located so as to be weighted for the actual fluid flow volume across the stream of the moving fluid.

7. A pitot of the type adapted to be positioned in a stream of moving fluid, such as an air duct, characterized by its ability to accurately measure wide variations in flow rate and comprising:
   a first plate having opposing sides and opposing leading and trailing edges;
   a second plate having opposing sides and opposing leading and trailing edges and wherein said first plate overlies said second plate in spaced relation;

a first hollow elongate tube having a proximal end and a distal end connected in sandwich fashion between said first plate and said second plate proximate the leading edges thereof, said first tube including a plurality of spaced apart holes defining openings, said openings located proximate the leading edges of said first plate and said second plate;

a second hollow elongate tube having a proximal end and a distal end connected in sandwich fashion between said first plate and said second plate, said second tube being positioned proximate the trailing edges thereof, said second tube including a plurality of spaced apart holes defining openings, said openings being proximate the trailing edge of said first plate and said second plate; and wherein the distance between said first tube and said second tube is between about four to ten times the diameter of the respective first and second tubes, the shape of the respective leading and trailing edges is symmetric, and the respective first and second plates are substantially planar and unobstructed, thereby ensuring smooth and even fluid flow past said pitot;

whereby when a fluid flows across the pitot, an output signal representative of the total pressure is produced at the proximal end of the first tube and an output signal representative of the static pressure is produced at the proximal end of the second tube and the difference therebetween may be measured to determine the velocity of the moving fluid.

8. A pitot according to claim 7 wherein said openings in said first tube are perpendicular to the plane of said plates; and wherein said openings in said second tube are parallel to the plane of said plates.

9. A pitot according to claim 7 wherein said first tube and said second tube are of equal diameters.

10. A pitot according to claim 7 wherein said openings are located so as to be weighted for the actual fluid flow volume across the stream of the moving fluid.

* * * * *